Figure 1:
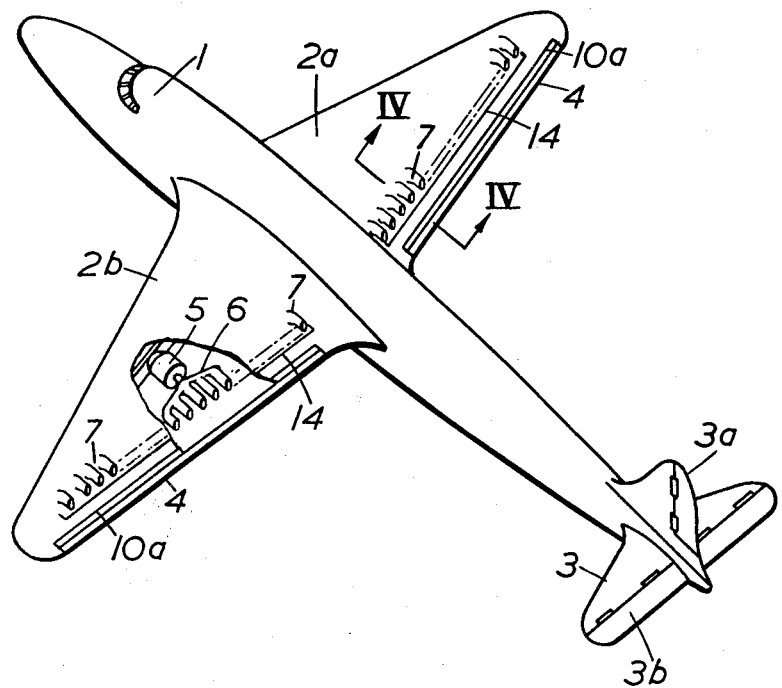

March 7, 1961  I. M. DAVIDSON ET AL  2,973,922
JET PROPELLED AIRCRAFT
Original Filed Aug. 30, 1954  2 Sheets-Sheet 1

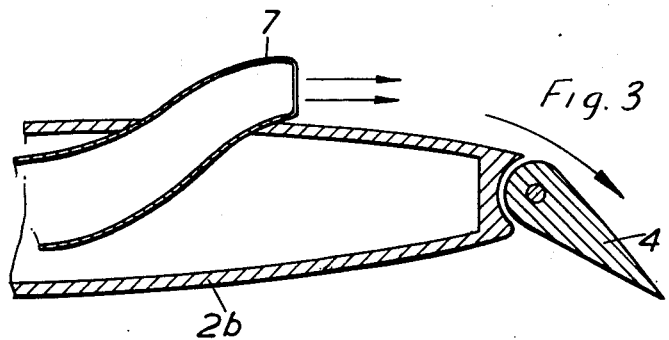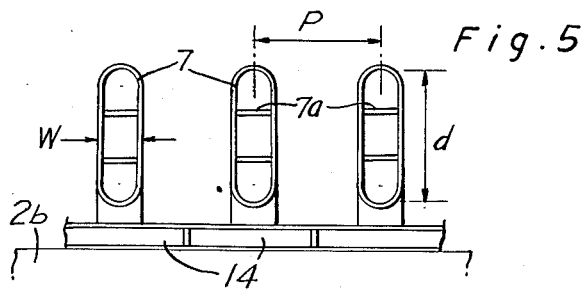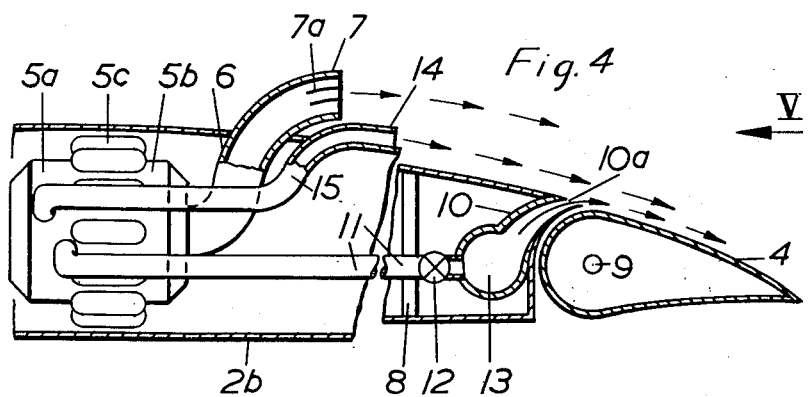

United States Patent Office 2,973,922
Patented Mar. 7, 1961

2,973,922
JET PROPELLED AIRCRAFT

Ivor Macaulay Davidson and Brian Stapleton Stratford, Farnborough, England, assignors to Power Jets (Research and Development) Limited, London, England, a company of Great Britain Continuation of abandoned application Ser. No. 452,901, Aug. 30, 1954. This application Apr. 10, 1959, Ser. No. 805,631

13 Claims. (Cl. 244—15)

The present application is a continuation of United States patent application Serial No. 452,901, filed August 30, 1954, and now abandoned.

In orthodox jet-propelled aircraft the propulsive efficiency of the forward thrust produced by a rearwardly-emitted jet of gas depends upon the difference between the leaving velocity of the jet, relatively to the aircraft, and the airspeed of the aircraft, and increases with decrease of this difference. Thus the thrust efficiency increases towards a maximum with approach towards a condition of zero absolute velocity of the issuing jet, i.e., towards a condition in which all the energy is imparted to the aircraft. The effective difference of velocity is that between two speeds relatively to the aircraft, viz, that of the jet as it issues and that of the air it meets and mixes with.

The air velocity relatively to the wing of an aircraft in any particular condition of flight varies from position to position around the wing; there are regions of maximum velocity over the top surface at positions appreciably forward of the trailing edge. To increase the propulsive efficiency and hence the thrust the present inventions aims broadly at providing means for emitting a propulsive jet or series of jets rearwardly from the top surface of the aircraft wing into a region which is such a region of maximum relative air velocity at a chosen condition.

Broadly according to the invention a jet-propelled aircraft includes nozzle means for emitting a propulsive jet from the top surface of the aircraft wing at a position appreciably forward of the trailing edge thereof and as a shallow jet directed rearwardly over the top of the wing towards the trailing edge. According to an important feature the jet is emitted rearwardly from the top surface of the wing from small separated rearwardly directed nozzles forming a series extending along the span of the wing, with gaps between them for the flow of air over the wing. According to a further feature, means for producing a propulsive jet which leaves the trailing edge of the aircraft wing as a long shallow sheet extending along a major part of the wing span (preferably as nearly as possible from wing tip to wing tip except where perhaps interrupted by a fuselage etc.) consist of nozzle means located above the top surface of the wing appreciably forward of the trailing edge directed to emit a shallow jet rearwardly over the top of the wing towards the trailing edge in combination with means for maintaining jet flow over the top surface of the wing, up to and over the trailing edge without separation from the wing surface. Where jets issue from a series of separated nozzles they should enter the air which is above the wing and between the nozzles and mix substantially completely therewith before reaching the trailing edge.

A convenient position for the issue of the jet or series of jets is somewhere in a range extending rearwardly from about the mid-chord position of the wing to a position at about 80% of the wing-chord dimension from the leading edge. Thus if the jet issues into and mixes with the air at a position which, for a particular condition of flight, e.g., under cruising conditions, is a region of maximum relative air velocity over the wing the thrust efficiency should be particularly good at that condition.

The invention tends to reduce objectionable noise produced by the jet during flight. It is known that a shallow nozzle is less objectionable than for example a nozzle of circular cross-section, because it emits its sound in the higher frequency range; moreover, with the nozzles on top, the aircraft wing will tend to be a fairly effective screen between this high frequency noise produced above the wing, and the ground below.

Means may be provided for controlling the aircraft by controlling the direction in which the jet, in the form of a long thin sheet, leaves the trailing edge of the wing, and these means may be short-span hinged wing-flaps forming the trailing edge of the wing.

The jet nozzle orifices may be in or adjacent to a step or small hump in the top of the wing, such a stepped wing being in itself known.

Figure 2:
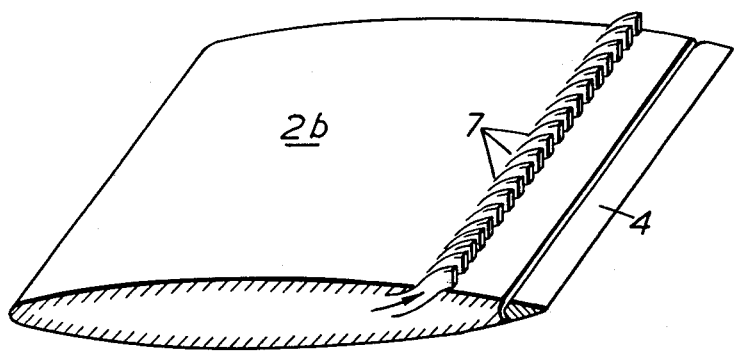

The invention is illustrated by the following accompanying drawings:

Figure 1 which is a view of one particular aircraft according to the invention;

Figures 2 and 3 which are diagrams of the principle of the invention;

Figure 4 which is an enlarged section through IV—IV of Figure 1 and

Figure 5 which is a view looking in direction of arrow V in Figure 4.

In Figure 1 the aircraft comprises the fuselage 1, the wings 2a and 2b, and the tailplane unit 3, with the usual rudder 3a and elevator 3b. Lift control means including the wing-flap 4, and as shown to a larger scale in Figure 4, extend along the full span of the trailing edges of the wings, substantially from wing-tig to wing-tip.

The propulsive jet is emitted by jet engines 5 through jet pipes 6 and nozzles 7. Thus, referring to Figures 2 and 3, which are diagrams to illustrate the principle of operation, the jet is emitted from small separated nozzles 7 forming a series extending along the span of the wing, above the wing, and considerably forward of the trailing edge, with gaps between the nozzles for flow of air over the wing, between them. The jets and the air mix and follow the top-surface of wing 2b and the mixture leaves the wing as a long thin sheet flowing over the hinged wing-flap 4. The sheet jet can be deflected downwardly, as shown in Figure 3, by downward movement of the wing-flap 4.

As seen best in Figure 4, the engines housed in the wing forward of the rear spar 8, are each of the orthodox type made up of a compressor 5a, a gas turbine 5b driving the compressor and a combustion system 5c receiving air from the compressor and supplying combustion products as working fluid to the turbine. Each has a set of short jet pipes 6 curving upward from the turbine exhaust outlet to the corresponding set of rearwardly-discharging jet nozzles above the top of the wing. Mounted on the top of the wing in such a position that the rearmost part of each is some distance forward from the trailing edge of the wing and in or forward of a region of maximum relative air velocity as hereinbefore set forth is a series of small hollow elements in the form of half fish-tails 7 spaced from one another but spread across practically the entire wing span. These constitute the aforesaid nozzles 7. Each is of course of a height above the top of the wing which is small compared to the dimensions of the wing. A jet nozzle aperture, which as shown in Figure 5 has a depth $d$ of about 4%–5% of the wing chord dimension and a width $w$ of about 0.3% to 1% of the wing chord dimension, and which may be divided by stiffeners 7a into a number of apertures, one above the other, is provided in the rear of each fish-tail. The pitch p of the series of fish-tails 7 is approximately equal to the nozzle depth d. The nozzles are directed rearwardly and with a possible slight inclination away from or downwardly towards the wing 2b.

The trailing edge of the wing 2b is constituted by the aforesaid hinged wing-flap 4 which can be of a much smaller chordwise extent than the usual wing-flaps—for example of the order of 5% of the wing chord. In this particular construction the hinging by hinge pin 9 may be such that at least in downwardly inclined positions and possibly in all positions of the flap there is a gap between the flap 4 and the integral part of the wing 2b for the passage of air which can flow up from below and over the upper surface of the flap. Also in this construction the integral part of the wing 2b terminates in the rear in a nozzle aperture 10a extending along the wing substantially from wing-tip to wing-tip and directed to discharge air from ducts 10 to flow over the top surface of and in contact with the flap 4. The mixture of air and hot gas from the main nozzles 7 then flows over the flap 4 with the air from the rear nozzle 10a.

Pipes 11 from the outlet from each compressor 5a or at least some of the compressors extend rearward through the wing between the jet pipes 6, and through a non-return valve 12 to a common manifold 13 and thence to the rear nozzle 10a by-passing the combustion system and the turbine. Alternatively the air discharged from the rear nozzle 10a may be supplied by separate compressors driven by some or all of the gas turbines.

The bottom of each nozzle 7 is preferably somewhat above the top surface of the wing 2b. A series of air-discharging nozzles 14 extending below the nozzles 7 may each be supplied with air branched from a pipe 15 from a low pressure stage of the associated compressor 5a or they may be supplied by separate compressors specially provided therefor and which may again be driven by some or all of the gas turbines. Nozzle 14 is typical of a possible series of such nozzles each at a different position between the nozzles 7 and the rear nozzle 10a and each extending over the wing span substantially from wing-tip to wing-tip and fed with air in any of the ways hereinbefore mentioned.

It will be seen that the hinged wing-flap 4 is similar to that set forth in the co-pending United States patent application Serial No. 421,620 in the names of the present inventors, filed April 7, 1954 and now abandoned, and of which a continuation United States patent application Serial No. 543,212 has been filed on October 27, 1955. More particularly the hinged wing-flap 4 is similar to that shown in Figure 9 of these applications. Since the lowering and raising of the flaps 4 will raise and lower the propulsive jet, the control arrangement for the aircraft may act to raise and lower the two flaps 4 for the equivalent of elevator control and to operate the two flaps 4 on wings 2a and 2b differentially for the equivalent of aileron control. Thus for this purpose the control mechanism for the wing-flaps 4 and for the elevator 3b can be as set forth in the co-pending United States patent application Serial No. 447,200 in the name of I. M. Davidson, filed August 2, 1954, and now abandoned, and of which a continuation-in-part United States patent application Serial No. 779,385 has been filed on December 10, 1958. The relative proportions of the tail-plane 3 and the rest of the aircraft can be also as set forth in these applications.

We claim:

1. An aircraft comprising a wing having a trailing edge wing flap extending along the wing span; a plurality of jet pipes projecting from the upper surface of the wing and terminating in rearwardly directed jet nozzles distributed along the wing span at a position located forwardly of the flap leading edge; jet propulsion means connected to said jet pipes to discharge propulsive jet streams through said nozzles; said nozzles being spaced apart from one another to define between them passages for the flow of part of the main air stream over the wing to mix with said jet streams, and being so shaped and directed as to cause the jet streams together with the air mixed therewith to flow rearwardly over and follow the upper surfaces of the wing and flap and to leave the flap trailing edge as a long shallow spanwise extending sheet, and the flap being disposed to guide the sheet along a path following its upper surface; and means mounting the flap for turning between a position in which it causes the sheet to leave the wing in a rearward direction and a position in which it causes the sheet to leave the wing in a downwardly inclined direction.

2. An aircraft comprising a wing having a trailing edge wing flap extending along the wing span; a plurality of jet pipes projecting from the upper surface of the wing and terminating in rearwardly directed jet nozzles distributed along the wing span at a position located forwardly of the flap leading edge; a plurality of gas turbine engines each comprising a compressor, combustion chamber and turbine, said turbines having their exhaust connected to said jet pipes to discharge through said nozzles propulsive jet streams of hot gases; said nozzles being spaced apart from one another to define between them passages for the flow of part of the main air stream over the wing to mix with said jet streams and being so shaped and directed as to cause the jet streams together with the air mixed therewith to flow rearwardly over and follow the upper surfaces of the wing and flap and to leave the flap trailing edge as a long shallow spanwise extending sheet, and the flap being disposed to guide the sheet along a path following its upper surface; and means mounting the flap for turning between a position in which it causes the sheet to leave the wing in a rearward direction and a position in which it causes the sheet to leave the wing in a downwardly inclined direction.

3. An aircraft comprising a wing having a trailing edge wing flap extending along the wing span; a plurality of jet pipes projecting from the upper surface of the wing and terminating in rearwardly directed jet nozzles distributed along the wing span at a position located forwardly of the flap leading edge; jet propulsion means connected to said jet pipes to discharge propulsive jet streams through said nozzles; said nozzles having their lower edges spaced above the wing upper surface, and being spaced apart from one another to define between them passages for the flow of part of the main air stream over the wing to mix with said jet streams; and being so shaped and directed as to cause the jet streams together with the air mixed therewith to flow rearwardly over and follow the upper surfaces of the wing and flap and to leave the flap trailing edge as a long shallow spanwise extending sheet, and the flap being disposed to guide the sheet along a path following its upper surface; and means mounting the flap for turning between a position in which it causes the sheet to leave the wing in a rearward direction and a position in which it causes the sheet to leave the wing in a downwardly inclined direction.

4. An aircraft according to claim 3 wherein the wing is formed with a further rearwardly directed nozzle extending along the wing span between the lower edges of the first-mentioned nozzles and the upper surface of the wing; and further comprising means to supply air to said nozzle, said nozzle being so directed as to discharge a stream of air rearwardly over the wing surface between said jet streams and the upper surface of the wing and flap.

5. An aircraft according to claim 4 wherein said jet propulsion means comprises a plurality of gas turbine engines, each comprising a compressor, combustion chamber and turbine, and further comprising means for leading compressed air from the compressor of each said gas turbine engine to said further nozzle.

6. An aircraft comprising a wing having a trailing edge wing flap extending along the wing span; a plurality of jet pipes projecting from the upper surface of the wing and terminating in rearwardly directed jet nozzles distributed along the wing span at a position located forwardly of the flap leading edge; jet propulsion means connected to said jet pipes to discharge propulsive jet streams through said nozzles; said nozzles having a width which is small compared with their depth and being spaced apart from one another by a distance approximately equal to their depth to define between them passages for the flow of part of the main air stream over the wing to mix with said jet streams, and being so shaped and directed as to cause the jet streams together with the air mixed therewith to flow rearwardly over and follow the upper surfaces of the wing and flap and to leave the flap trailing edge as a long shallow spanwise extending sheet, and the flap being disposed to guide the sheet along a path following its upper surface; and means mounting the flap for turning between a position in which it causes the sheet to leave the wing in a rearward direction and a position in which it causes the sheet to leave the wing in a downwardly inclined direction.

7. An aircraft comprising a pair of wings extending on opposite sides of the aircraft fore-and-aft centre line and each having a trailing edge wing flap extending along the wing span; a plurality of jet pipes projecting from the upper surface of the wing and terminating in rearwardly directed jet nozzles distributed along the wing span at a position located forwardly of the flap leading edge; a plurality of jet engines connected to said jet pipes to discharge propulsive jet streams through said nozzles, said jet engines being such that said jet streams afford sufficient propulsive effort to propel the aircraft; said nozzles being spaced apart from one another to define between them passages for the flow of part of the main air stream over the wing to mix with said jet streams, and being so shaped and directed as to cause the jet streams together with the air mixed therewith to flow rearwardly over and follow the upper surfaces of the wings and flaps and to leave the flap trailing edges as long shallow sheets extending spanwise along each wing, and the flaps being disposed to guide the sheets along paths following their upper surfaces; and means mounting each flap for turning between a position in which it causes the sheet to leave the wing in a rearward direction and a position in which it causes the sheet to leave the wing in a downwardly inclined direction.

8. An aircraft comprising a pair of wings extending on opposite sides of the aircraft fore-and-aft centre line and each having a trailing edge wing flap extending along the wing span; a plurality of jet pipes projecting from the upper surface of the wing and terminating in rearwardly directed jet nozzles distributed along the wing span at a position located forwardly of the flap leading edge; jet propulsion means connected to said jet pipes to discharge propulsive jet streams through said nozzles; said nozzles being spaced apart from one another to define between them passages for the flow of part of the main air stream over the wing to mix with said jet streams, and being so shaped and directed as to cause the jet streams together with the air mixed therewith to flow rearwardly over and follow the upper surfaces of the wings and flaps and to leave the flap trailing edges as long shallow sheets extending spanwise along each wing, and the flaps being disposed to guide the sheets along paths following their upper surfaces; means mounting said flaps to turn upwardly and downwardly to deflect the sheets; and means to turn said flaps upwardly and downwardly either together or differentially at will.

9. An aircraft comprising a wing having a trailing edge wing flap extending along the wing span; a plurality of jet pipes terminating in rearwardly directed jet nozzles distributed along the wing span above the upper surface of the wing at a position located forwardly of the flap leading edge; jet propulsion means connected to said jet pipes to discharge propulsive jet streams through said nozzles; said nozzles being spaced apart from one another to define between them passages for the flow of part of the main air stream over the wing, and being so arranged as to cause the jet streams to flow rearwardly over and follow the upper surface of the flap and to leave the flap trailing edge as a long shallow spanwise extending sheet, and the flap being disposed to guide the sheet along a path following its upper surface; and means mounting the flap for turning between a position in which it causes the sheet to leave the wing in a rearward direction and a position in which it causes the sheet to leave the wing in a downwardly inclined direction.

10. An aircraft comprising a wing having a trailing edge wing flap extending along the wing span; a plurality of jet pipes terminating in rearwardly directed jet nozzles distributed along the wing span at a position located forwardly of the flap leading edge; a plurality of gas turbine engines each comprising a compressor, combustion chamber and turbine, said turbines having their exhaust connected to said jet pipes to discharge through said nozzles propulsive jet streams of hot gases; said nozzles being spaced apart from one another to define between them passages for the flow of part of the main air stream over the wing, and being so arranged as to cause the jet streams together with the air mixed therewith to flow rearwardly over and follow the upper surface of the flap and to leave the flap trailing edge as a long shallow spanwise extending sheet, and the flap being disposed to guide the sheet along a path following its upper surface; and means mounting the flap for turning between a position in which it causes the sheet to leave the wing in a rearward direction and a position in which it causes the sheet to leave the wing in a downwardly inclined direction.

11. An aircraft comprising a pair of wings extending on opposite sides of the aircraft fore-and-aft centre line and each having a trailing edge wing flap extending along the wing span; a plurality of jet pipes terminating in rearwardly directed jet nozzles distributed along the wing span above the upper surface of the wing at a position located forwardly of the flap leading edge; a plurality of jet engines connected to said jet pipes to discharge propulsive jet streams through said nozzles, said jet engines being such that said jet streams afford sufficient propulsive effort to propel the aircraft; said nozzles being spaced apart from one another to define between them passages for the flow of part of the main air stream over the wing, and being so arranged as to cause the jet streams to flow rearwardly over and follow the upper surfaces of the flaps and to leave the flap trailing edges as long shallow sheets extending spanwise along each wing, and the flaps being disposed to guide the sheets along paths following their upper surfaces; and means mounting each flap for turning between a position in which it causes the sheet to leave the wing in a rearward direction and a position in which it causes the sheet to leave the wing in a downwardly inclined direction.

12. An aircraft comprising a wing having a trailing edge wing flap extending along its span, said wing being formed with a long shallow rearwardly directed nozzle extending along the wing span; a plurality of gas turbine jet propulsion engines, each comprising a compressor, combustion chamber and turbine; means connecting each said compressor to supply air to said nozzle, said means including a common manifold, a connection between the manifold and the nozzle and a connection comprising a non-return valve between each said compressor and the manifold; said nozzle being shaped and disposed to discharge said air rearwardly as a layer over the upper surface of the wing flap; means defining a plurality of further rearwardly directed nozzles separate from said first mentioned nozzle; and means connecting said turbines to discharge their exhaust gas streams through said further nozzles.

13. An aircraft according to claim 12 wherein said further nozzles are spaced apart from one another.

References Cited in the file of this patent

UNITED STATES PATENTS

| | | |
|---|---|---|
| 1,903,818 | Jutting | Apr. 18, 1933 |
| 2,396,911 | Anxionnaz | Mar. 19, 1946 |
| 2,585,676 | Poisson-Quinton | Feb. 12, 1952 |
| 2,589,732 | Riviere | Mar. 18, 1952 |
| 2,597,610 | Berlinner | May 20, 1952 |

FOREIGN PATENTS

| | | |
|---|---|---|
| 971,992 | France | Jan. 9, 1952 |